United States Patent
Ryu et al.

(10) Patent No.: US 10,985,388 B2
(45) Date of Patent: Apr. 20, 2021

(54) METHOD AND APPARATUS FOR ESTIMATING HYDROGEN CROSSOVER LOSS OF FUEL CELL SYSTEM

(71) Applicants: HYUNDAI MOTOR COMPANY, Seoul (KR); KIA MOTORS CORPORATION, Seoul (KR)

(72) Inventors: Jung Hwan Ryu, Suwon-si (KR); Soon Woo Kwon, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 366 days.

(21) Appl. No.: 15/623,225

(22) Filed: Jun. 14, 2017

(65) Prior Publication Data

US 2018/0166717 A1  Jun. 14, 2018

(30) Foreign Application Priority Data

Dec. 14, 2016 (KR) .................... 10-2016-0170147

(51) Int. Cl.
*H01M 8/04* (2016.01)
*H01M 8/04664* (2016.01)
(Continued)

(52) U.S. Cl.
CPC ... *H01M 8/04671* (2013.01); *H01M 8/04197* (2016.02); *H01M 8/04231* (2013.01); *H01M 8/04328* (2013.01); *H01M 8/04388* (2013.01); *H01M 8/04552* (2013.01); *H01M 8/04582* (2013.01); *H01M 8/04* (2013.01); *H01M 8/04313* (2013.01); *H01M 8/04559* (2013.01); *H01M 8/04589* (2013.01);
(Continued)

(58) Field of Classification Search
None
See application file for complete search history.

(56) References Cited

U.S. PATENT DOCUMENTS

| 2006/0166060 A1* | 7/2006 | Miura | H01M 8/04223 |
| | | | 429/429 |
| 2006/0210850 A1* | 9/2006 | Abouatallah | H01M 8/04305 |
| | | | 429/90 |
| 2007/0196705 A1* | 8/2007 | Kasahara | H01M 8/04089 |
| | | | 429/429 |
| 2009/0035612 A1* | 2/2009 | Suematsu | H01M 8/04089 |
| | | | 429/432 |
| 2009/0246570 A1 | 10/2009 | Hirashige et al. | |

(Continued)

FOREIGN PATENT DOCUMENTS

| JP | 2007-311027 A | 11/2007 |
| JP | 2009-512134 A | 3/2009 |

(Continued)

*Primary Examiner* — Jeremiah R Smith
(74) *Attorney, Agent, or Firm* — Morgan, Lewis & Bockius LLP

(57) ABSTRACT

A method of estimating hydrogen crossover loss of a fuel cell system including a stack for producing power through a reaction of hydrogen serving as fuel and air serving as an oxidizer includes driving the fuel cell system; estimating a hydrogen crossover rate right after a channel of an anode is purged; determining whether a cell voltage of a fuel cell is normal; and comparing the estimated hydrogen crossover rate with a predetermined reference value based on a result of the determining of whether the cell voltage of the fuel cell is normal to determine whether a pinhole or leakage occurs. Accordingly, whether a pinhole or leakage occurs in the fuel cell system may be more effectively sensed.

7 Claims, 6 Drawing Sheets

(51) Int. Cl.
*H01M 8/04537* (2016.01)
*H01M 8/04223* (2016.01)
*H01M 8/0438* (2016.01)
*H01M 8/0432* (2016.01)
*H01M 8/04082* (2016.01)
*H01M 8/1018* (2016.01)
*H01M 8/10* (2016.01)
*H01M 8/04313* (2016.01)

(52) U.S. Cl.
CPC .... *H01M 8/04664* (2013.01); *H01M 8/04679* (2013.01); *H01M 8/10* (2013.01); *H01M 2008/1095* (2013.01); *H01M 2250/20* (2013.01); *Y02T 90/40* (2013.01)

(56) References Cited

U.S. PATENT DOCUMENTS

| | | | |
|---|---|---|---|
| 2013/0295477 A1* | 11/2013 | Nanba | H01M 8/04828 429/415 |
| 2014/0120442 A1* | 5/2014 | Dileo | H01M 8/04679 429/443 |
| 2019/0245228 A1* | 8/2019 | Lanzinger | H01M 8/04201 |

FOREIGN PATENT DOCUMENTS

| | | |
|---|---|---|
| JP | 2010-176977 A | 8/2010 |
| JP | 5257994 B2 | 8/2013 |
| KR | 10-2008-0094070 A | 10/2008 |
| KR | 10-2009-0022521 A | 3/2009 |
| KR | 10-0972938 B1 | 7/2010 |

* cited by examiner

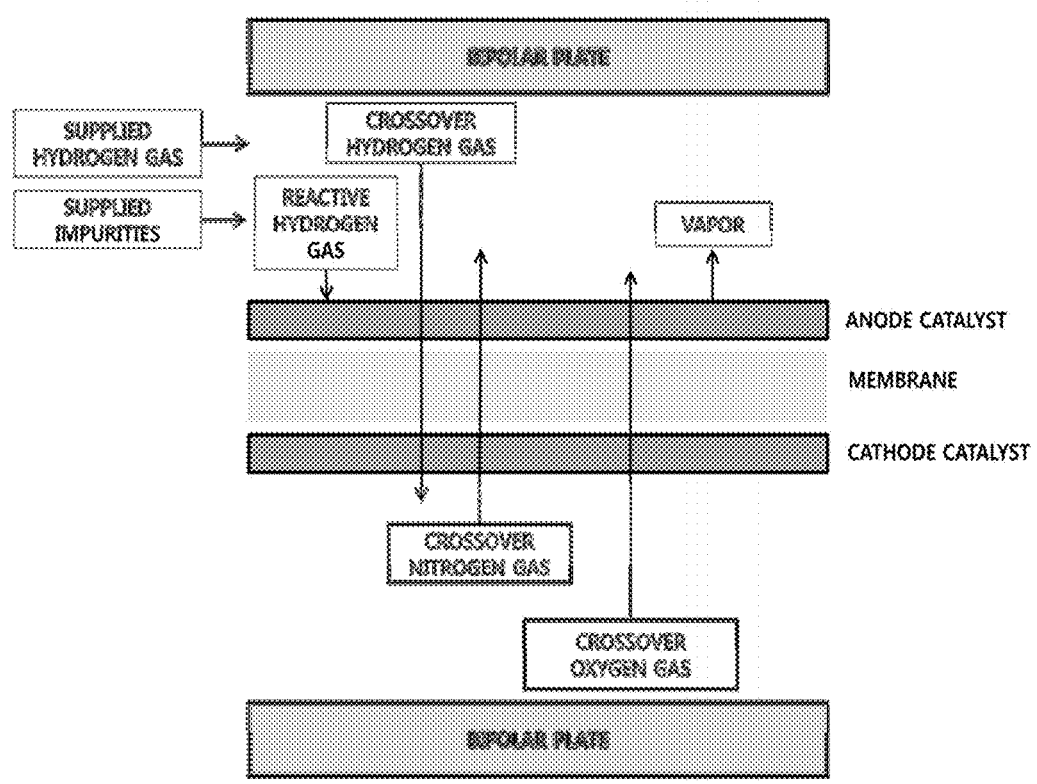

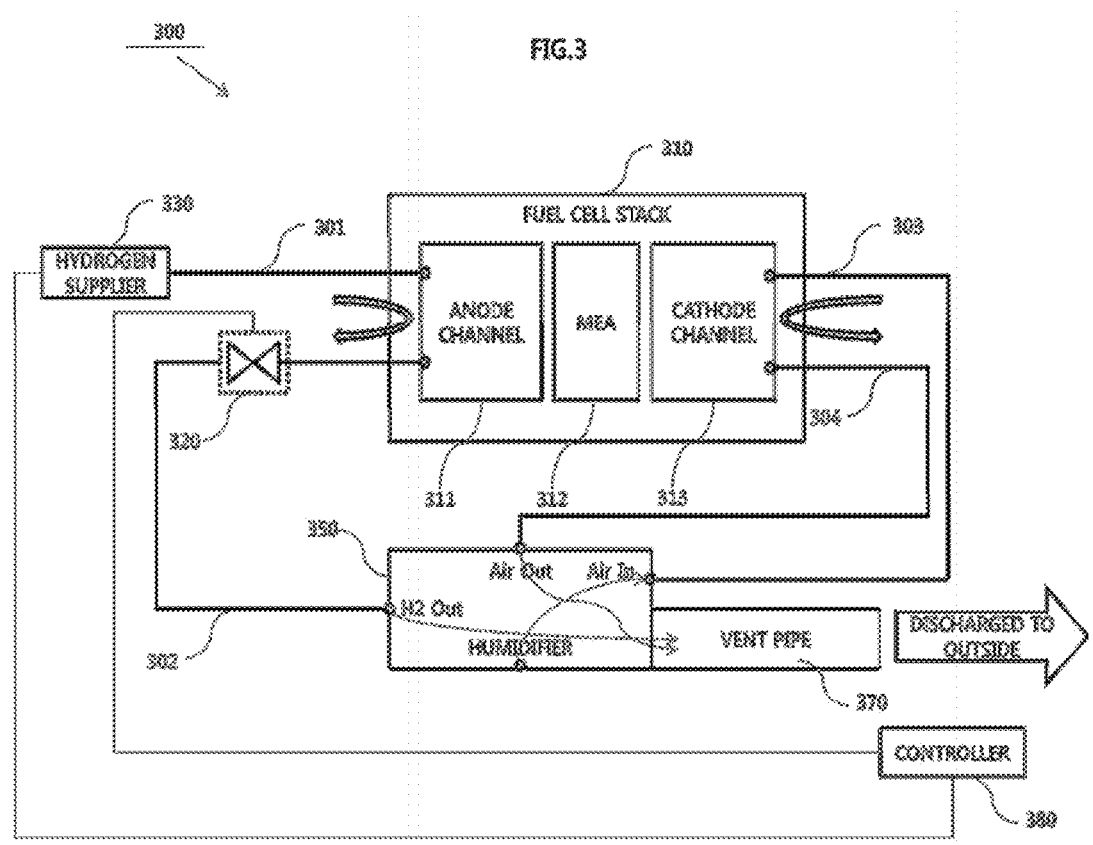

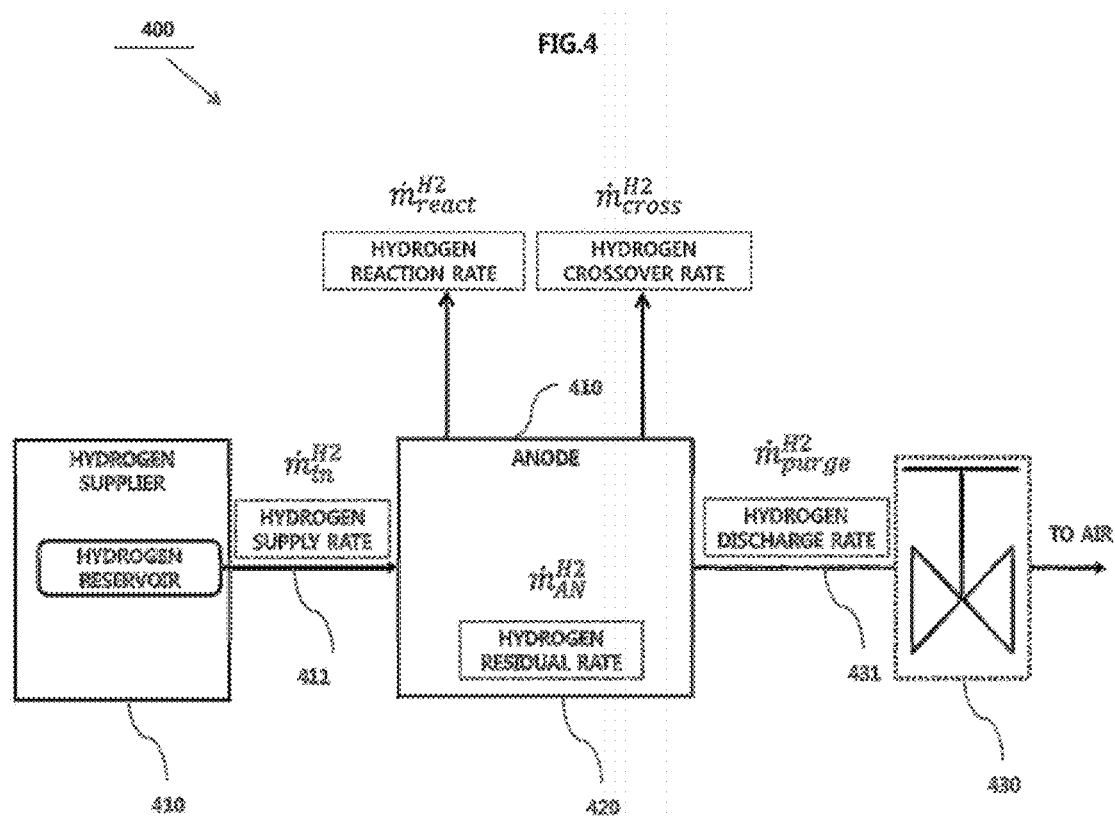

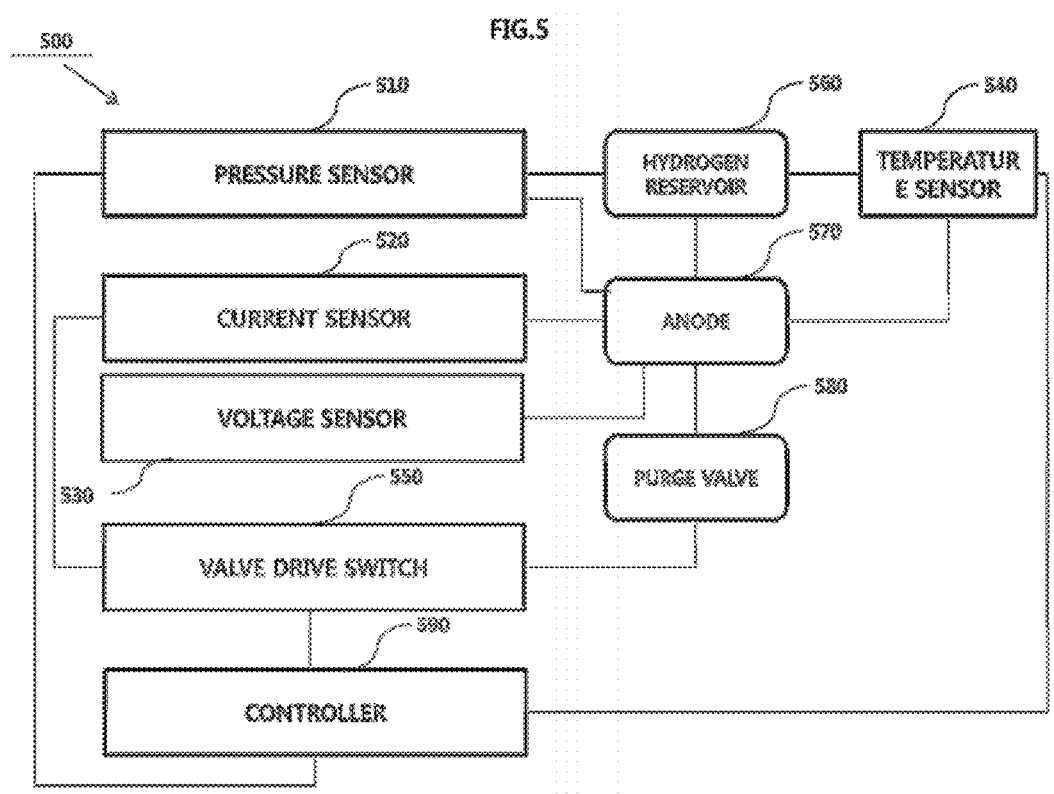

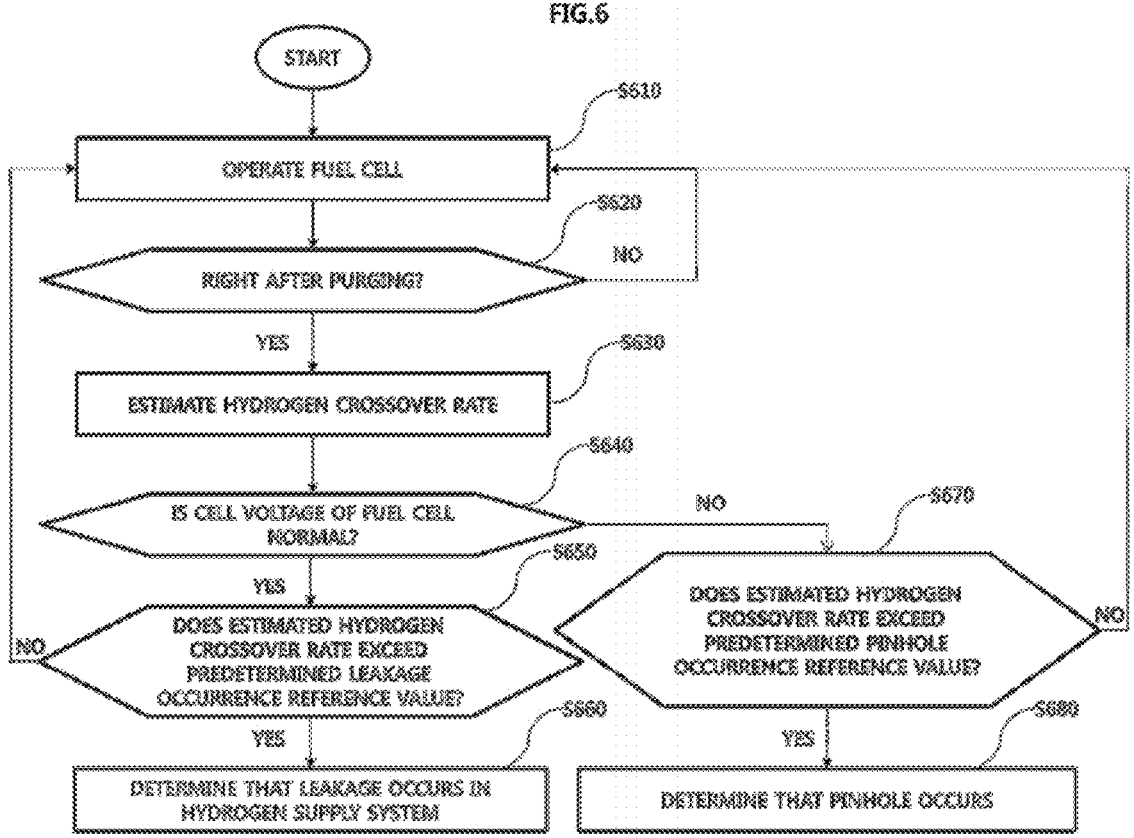

METHOD AND APPARATUS FOR ESTIMATING HYDROGEN CROSSOVER LOSS OF FUEL CELL SYSTEM

CROSS-REFERENCE TO RELATED APPLICATIONS

This application is based on and claims the benefit of priority to Korean Patent Application No. 10-2016-0170147, filed on Dec. 14, 2016 with the Korean Intellectual Property Office, the disclosure of which is hereby incorporated in its entirety by reference.

TECHNICAL FIELD

The present disclosure relates to a fuel cell system, and more particularly, to a method and apparatus which are capable of estimating crossover loss of hydrogen gas in a fuel cell stack of a fuel cell system.

BACKGROUND

A fuel cell system is a type of electric power generation system which directly and electrochemically transforms chemical energy of fuel into electric energy in a fuel cell stack instead of transforming the chemical energy of the fuel into heat by burning the fuel.

The fuel cell system includes a fuel cell stack which generates electric energy; a hydrogen supply device which supplies hydrogen as fuel to the fuel cell stack; an air (oxygen) supply device which supplies the fuel cell stack with oxygen contained in air as an oxidizer required in an electrochemical reaction; a hydrogen supply device which supplies hydrogen gas to the fuel cell stack; a thermal management system (TMS) which discharges heat of reaction from the fuel cell stack to outside of the system, controls operating temperature of the fuel cell stack, and performs a water management function; and a fuel cell system controller which controls overall operations of the fuel cell system.

Owing to the above structure, in the fuel cell system, hydrogen serving as fuel may react with oxygen contained in air to generate electric power, and heat and water may be discharged as by-products.

A type of a fuel cell which has drawn most attention as a fuel cell used in a vehicle is an ion-exchange membrane fuel cell because of having highest power density (e.g., a proton exchange membrane fuel cell or a polymer electrolyte membrane fuel cell (PEMFC)) among all fuel cell types. The ion-exchange membrane fuel cell has a low working temperature and thus has a short start-up time and a rapid power conversion reaction time.

A fuel cell stack mounted in the ion-exchange membrane fuel cell includes a membrane electrode assembly (MEA) having opposite ends to which an electrode/catalyst layer (in which an electrochemical reaction occurs) is attached with respect to a polymer electrolyte membrane (in which hydrogen ions move); a gas diffusion layer (GDL) through which reactive gases are smoothly distributed and electric power is transferred; a gasket and a coupling device for maintaining hermeticity and appropriate coupling pressure of reactive gases and cooling water; and a bipolar plate for moving the reactive gases and the cooling water. Electric current is generated through a fuel cell reaction when hydrogen and oxygen (air) are supplied.

Fine pinholes, cracks, or the like may occur in the MEA during a manufacturing process thereof or during an operation of a fuel cell. The fine pinholes and cracks may accelerate degradation of film quality while causing an excessive amount of oxygen to crossover into an anode electrode layer and lowering performance of a fuel cell.

In the fuel cell system, hydrogen concentration in a discharged gas should be controlled to be maintained at a predetermined level or less so as to minimize a risk of explosion or ignition caused by hydrogen gas contained in the discharged gas.

However, hydrogen gas exhausted via an air discharge line may be discharged via an exhaust system due to hydrogen gas discharged via a hydrogen purge valve of the fuel cell system and a crossover phenomenon caused by a gas concentration difference between an anode channel and a cathode channel in the fuel cell stack.

A permitted concentration of hydrogen gas exhausted from a fuel cell system according to the global technical regulation (GTR) which has been currently and globally applied should be 8% or less, and an average of the concentrations of hydrogen gas measured for three seconds should not exceed 4%.

Thus, fuel-cell vehicles using hydrogen as fuel should be controlled to discharge an exhaust gas with hydrogen concentration of a predetermined level or less at all times under all operating conditions.

However, a crossover rate of hydrogen gas cannot be directly measured.

A system according to the related art which measures a hydrogen crossover rate by measuring individual cell voltages of a fuel cell stack including a large number of cells stacked and referring to cell deviations, i.e., the differences between an average cell voltage and the individual cell voltages, has been introduced. However, all the individual cell voltages should be measured according to this method.

A method of directly estimating a hydrogen crossover rate using a diffusion law according to the related art is disadvantageous in that a nitrogen crossover rate should be calculated and thus a sensor for measuring state information of a hydrogen electrode as well as an air electrode, e.g., temperature information, pressure information, etc., is needed. In particular, with the method of directly estimating a hydrogen crossover rate using the diffusion law according to the related art, it is impossible to estimate a crossover rate due to pinholes, cracks, or the like.

SUMMARY

One embodiment of the present disclosure provides a method and apparatus for estimating hydrogen crossover loss of a fuel cell system.

Another embodiment of the present disclosure provides a method and apparatus for estimating hydrogen crossover loss of a fuel cell system, which are capable of sensing the occurrence of pinholes and pipe leakage based on an estimated hydrogen crossover loss rate and a cell voltage of a fuel cell.

Embodiments are, however, not limited thereto and additional embodiments will be apparent to those of ordinary skill in the art from the following description.

Embodiments provide a method and apparatus for estimating hydrogen crossover loss of a fuel cell system.

According to one embodiment, a method of estimating hydrogen crossover loss of a fuel cell system including a fuel cell stack for producing power through a reaction of hydrogen serving as fuel and air serving as an oxidizer includes driving the fuel cell system; estimating a hydrogen crossover rate right after a channel of an anode is purged; determining whether a cell voltage of a fuel cell is normal; and comparing the estimated hydrogen crossover rate with a predetermined reference value based on a result of the determining of whether the cell voltage of the fuel cell is normal to determine whether a pinhole or leakage occurs.

According to another embodiment, a hydrogen crossover loss estimating apparatus included in a fuel cell system which produces power through a reaction of hydrogen serving as fuel and air serving as an oxidizer includes a hydrogen reservoir; an anode configured to be supplied with hydrogen gas from the hydrogen reservoir and to produce the power; a purge valve configured to control an exhaust gas output from the anode; a voltage sensor configured to measure a cell voltage of a fuel cell; and a controller configured to estimate a hydrogen crossover rate right after purging is performed, and compare the estimated hydrogen crossover rate with a predetermined reference value based on whether or not the cell voltage of the fuel cell is normal to determine whether a pinhole or leakage occurs.

According to still another embodiment of the present disclosure, a computer-readable program is provided for executing one of methods of controlling the concentration of hydrogen discharged from the fuel cell system, and a recording medium having recorded thereon the program.

These embodiments are, however, only some of embodiments, and thus those of ordinary skill in the art could derive and understand various embodiments reflecting technical features of the inventive concept from the following description.

BRIEF DESCRIPTION OF THE DRAWINGS

FIG. 2 is a diagram illustrating a change in a hydrogen concentration of a fuel cell stack according to an embodiment of the present disclosure;

FIG. 3 is a block diagram of a fuel cell system according to another embodiment of the present disclosure;

FIG. 4 is a diagram illustrating a method of estimating a hydrogen crossover rate in a fuel cell system according to an embodiment of the present disclosure;

FIG. 5 is a block diagram of an apparatus for estimating hydrogen crossover loss of a fuel cell system according to an embodiment of the present disclosure; and FIG. 6 is a flowchart of a method of estimating a cause of hydrogen crossover loss of a fuel cell system according to an embodiment of the present disclosure.

DETAILED DESCRIPTION

Figure 1:
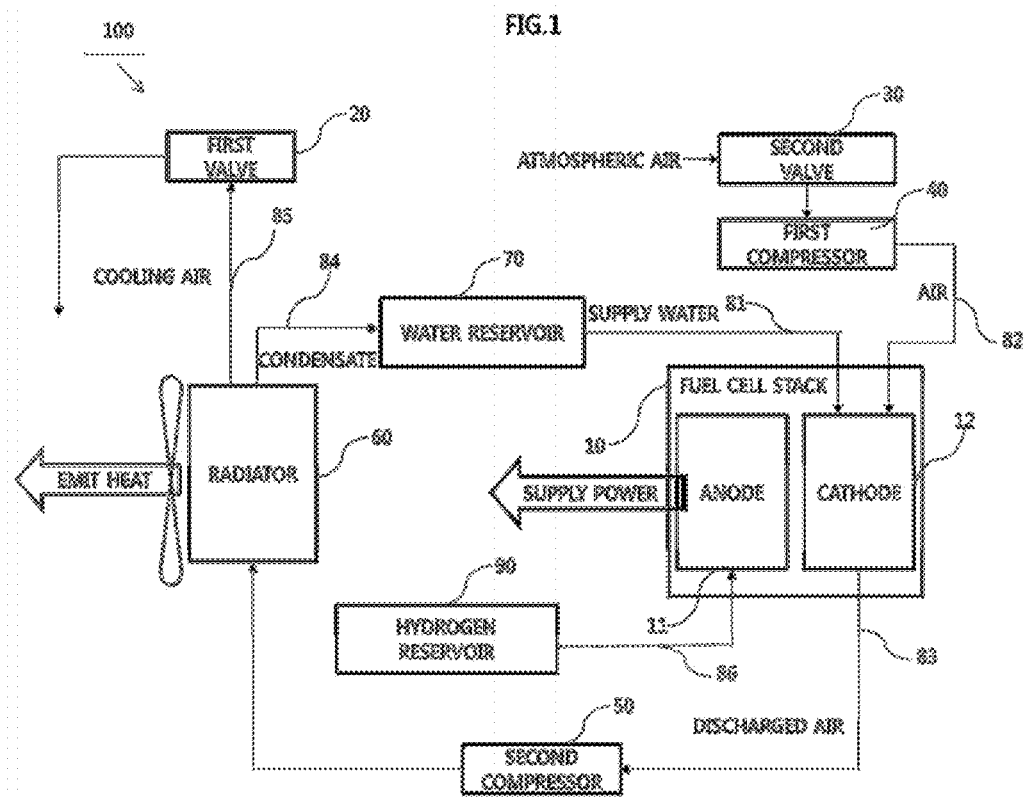
FIG. 1 is a block diagram of a fuel cell system according to an embodiment of the present disclosure.

Hereinafter, apparatuses and methods according to various embodiments will be described in greater detail with reference to the accompanying drawings. In the present disclosure, the terms "module" and "unit" related to elements are given or used merely for convenience of explanation and should thus not be understood to include particular meanings or functions. Although it is described that some elements of embodiments as set forth herein are integrated into one form or operated in combination, the present disclosure is not limited thereto. That is, one or more of all the elements may be selectively combined and operated without departing from the scope of embodiments. Furthermore, all the elements may be individually embodied as independent hardware elements, and some or all of the elements may be selectively combined and implemented in the form of a computer program having program modules for performing some or all of functions of a combination of one or more hardware elements. Code and code segments of the computer program may be easily inferred by those skilled in the art. The computer program may be stored in a computer-readable recording medium, and read and executed by a computer to implement embodiments. Examples of the computer-readable recording medium include a magnetic recording medium, an optical recording medium, etc.

It will be understood that the terms "comprise" and/or "comprising," when used herein, specify the presence of stated features, integers, steps, operations, elements, and/or components, but do not preclude the presence or addition of one or more other features, integers, steps, operations, elements, components, and/or groups thereof. Unless otherwise defined, all terms (including technical and scientific terms) used herein have the same meaning as commonly understood by one of ordinary skill in the art to which embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that, although the terms "first", "second", "third", "(a)", "(b)," etc., may be used herein to describe various elements, these elements should not be limited by these terms. These terms are only used to distinguish one element from another element and thus the natures, sequence, order, etc. of elements are not limited by these terms. It will be understood that when an element is referred to as being "coupled to", "combined with", or "connected to" another element, the element can be directly coupled to, combined with, or connected to another element or intervening elements may be coupled, combined, or connected between these elements.

Basic operations and a structure of a fuel cell system will be briefly described below.

In general, a fuel cell system using hydrogen as fuel may include a hydrogen reservoir for supplying hydrogen gas to a fuel cell stack, a compressor for supplying compressed air to the fuel cell stack, the fuel cell stack for generating power through a water generation reaction, an exhaust system for discharging an exhaust gas from the fuel cell stack, etc., but these elements are merely examples. According to one embodiment, the fuel cell system may further include other elements. For example, the fuel cell system may further include a water reservoir for supplying water to be used to cool the fuel cell stack.

In the fuel cell stack of the fuel cell system, hydrogen is supplied to an anode which is a positive electrode (which may be also referred to as a 'fuel electrode'), and oxygen (air) is supplied to a cathode which is a negative electrode (which may be also referred to as an 'air electrode' or an 'oxygen electrode').

The hydrogen supplied to the positive electrode decomposes into hydrogen ions (protons) (H+) and electrons (e−) by catalysts of electrode layers formed at opposite ends of an electrolyte membrane. Only the hydrogen ions selectively pass through an electrolyte membrane which is a positive ion-exchange membrane and are then transferred to the negative electrode, and at the same time, the electrons are transferred to the negative electrode via the GDL and the bipolar plate which are conductors.

In this case, in the negative electrode, the hydrogen ions supplied via the electrolyte membrane and the electrons transferred via the bipolar plate react with oxygen contained in air supplied to the negative electrode by an air supply device and thus a water generation reaction occurs.

As the hydrogen ions move, the electrons flow via external conducting wire and electric current is thus generated due to the flow of the electrons. Furthermore, heat is incidentally generated during the water generation reaction.

The reaction of the electrodes in the ion exchange membrane fuel cell may be expressed by the following reaction formulae:

[reaction in fuel electrode] $2H_2 \rightarrow H^+ + 4e^-$

[reaction in air electrode] $O_2 + 4H^+ + 4e^- \rightarrow 2H_2O$

[whole reaction] $2H_2 + O_2 \rightarrow 2H_2O + $ electric energy + heat energy In the above reaction, the hydrogen ions pass through a polymer membrane. The membrane permeability of hydrogen is determined by a water content function. As the reaction progresses, water (vapor) is generated and humidifies a reactive gas and a film.

When a gas is dry, all the water generated through the reaction is used to humidify air and thus the polymer membrane becomes dry. Thus, the polymer membrane should be maintained in a wet state to appropriately operate a fuel cell. This is because the penetrability of hydrogen ions is determined by a function of water contained in a film.

When a film is extremely wet, the pores of the GDL are clogged and thus the reactive gas may be prevented from being in contact with the catalyst. Thus, it is very important to appropriately maintain the content of water in the film.

The fuel cell is supplied with as atmospheric air as an oxidizer rather than pure oxygen. However, the humidity of the atmospheric air is not enough to make the film wet and thus the air may be sufficiently humidified to smoothly operate the fuel cell before the air is supplied to the fuel cell.

The fuel cell stack of the fuel cell system is a structure in which unit cells are repeatedly stacked. Here, the unit cells are most fundamental fuel cell elements needed to generate electric energy through a reaction between hydrogen and oxygen.

Each of the unit cells has a structure in which a bipolar plate, a GDL, and an MEA are stacked together. Here, the bipolar plate is a key component of the fuel cell which has various functions, e.g., structurally supporting the MEA and the GDL, collecting and transferring generated electric current, transporting a reactive gas, transferring and removing by-products, transporting cooling water to remove heat of reaction, etc.

FIG. 1 is a block diagram of a fuel cell system 100 according to an embodiment of the present disclosure.

Referring to FIG. 1, the fuel cell system 100 may include a fuel cell stack 10, first and second valves 20 and 30, first and second compressors 40 and 50, a radiator 60, a water reservoir 70, and a hydrogen reservoir 90. The fuel cell system 100 may further include a fuel cell system controller (not shown) which controls the elements of the fuel cell system 100 using an electrical control signal.

The fuel cell stack 10 may include an anode 11 which is a positive electrode and a cathode 12 which is a negative electrode, and generates electric energy and vapor through a water generation reaction occurring between the anode 11 and the cathode 12. In this case, electric power generated in the stack 10 may be output via the anode 11.

As illustrated in FIG. 1, the fuel cell system 100 according to an embodiment may be a vapor cooling type system, in which water cooling heat generated in the fuel cell stack 10 and air serving as an oxidizer may be supplied to the cathode 12 via a water supply line 81 and an air supply line 82 to cause a water generation reaction to occur in the stack fuel cell 10.

In this case, the amount and pressure of the air to be supplied to the cathode 12 may be controlled by the second valve 30 and the first compressor 40.

Hydrogen gas stored in the hydrogen reservoir 90 may be supplied to the anode 11 of the fuel cell stack 10 via a hydrogen supply line 86.

In the fuel cell system, 100, the amount and pressure of air to be supplied to the cathode 12 may be controlled based on a target operating temperature of the fuel cell stack 10. According to the water generation reaction, heat generated in the stack fuel cell 10 evaporates water supplied to the cathode 12 via the water supply line 81 to generate vapor. In this case, the stack fuel cell 10 is cooled by evaporative latent heat of the generated vapor. High-temperature vapor may be also generated through a water generation reaction occurring in the stack fuel cell 10.

The high-temperature vapor generated in the fuel cell stack 10 may be transferred to the second compressor 50 via an air discharge line 83 connected to one side of the cathode 12. In this case, the vapor discharged via the air discharge line 83 may be in an almost saturated state.

Evaporative latent heat of water is about 2300 kJ/kg at 80° C. and is thus very higher than sensible heat.

As temperature of the fuel cell stack 10 is increased and pressure thereof is decreased, water is likely to be evaporated in the fuel cell stack 10. Similarly, the amount of evaporative vapor contained in air supplied to the cathode 12 of the fuel cell stack 10 increases as the temperature of the fuel cell stack 10 is increased and the pressure of the fuel cell stack 10 is decreased.

Thus, in order to accelerate evaporation of water supplied to the cathode 12, the temperature of the cathode 12 should be high and the pressure thereof should be low. However, in order to increase the performance of the fuel cell stack 10, the temperature and pressure of the cathode 12 should be maintained appropriately.

For example, inner pressure of the cathode 12 may be adjusted by controlling the first compressor 40 and the second compressor 50. As another example, the inner pressure of the cathode 12 may be adjusted by controlling the second valve 30, the first compressor 40, and the second compressor 50.

Pressure of hot and humid vapor supplied to the radiator 60 may be controlled by the second compressor 50.

The radiator 60 may emit heat of high-temperature/high-pressure and humid vapor to generate condensate. In detail, as the radiator 60 emits heat, the temperature of the radiator 60 becomes low and the inner pressure of the radiator 60 becomes high to decrease absolute humidity and thus vapor may be thus condensed into water.

The amount of the water condensed from the vapor by the radiator 60 (hereinafter referred to as 'condensate' for convenience of explanation) may be adjusted by controlling total pressure of an outlet of the radiator 60 according to the temperature and amount of air of the outlet of the radiator 60. Here, the total pressure of the outlet of the radiator 60 may be controlled using the second compressor 50 and the first valve 20.

In detail, the temperature and amount of air of the outlet of the radiator 60 may be determined by temperature of external air and an absolute quantity of heat to be emitted. The amount of vapor to be discharged using the first valve 20 (i.e., the amount of vapor to be supplied to the radiator 60—the amount of water condensed from the vapor by the radiator 60) may be adjusted by controlling the total pressure of the outlet of the radiator 60 according to the determined temperature and amount of air of the outlet of the radiator 60. That is, the inside humidity of a vehicle may be adjusted by controlling the total pressure of the outlet of the radiator 60 using the second compressor 50 and the first valve 20.

The amount of condensate from the radiator 60 may increase as the amount of air is decreased, the temperature of the radiator 60 is decreased, and the inside pressure of the radiator 60 is increased.

Water condensed from the vapor by the radiator 60 may be transferred to the water reservoir 70 via an additional condensate pipe 84 provided at one side of the outlet of the radiator 60 but this method is merely one embodiment. Thus, a method of transferring the water condensed from the vapor by the radiator 60 to the water reservoir 70 is not limited thereto. For example, the radiator 60 may additionally include a drainage pump (not shown) to transfer the condensed water to the water reservoir 70 via the condensate pipe 84. As another example, the water condensed from the vapor by the radiator 60 may be transferred to the water reservoir 70 via the condensate pipe 84 by performing pressure control using the second compressor 50.

Cooling air exhausted via the outlet of the radiator 60 may be humid air containing a certain amount of vapor, and may be transferred to the first valve 20 via a radiator exhaust line 85 and be then discharged to the outside of the fuel cell system 100.

The cathode 12 of the fuel cell stack 10 may be supplied with a sufficient amount of heat and be thus in a state in which water is likely to evaporate. Thus, relative humidity of air discharged via the cathode 12 may be in an almost saturated state. Accordingly, in order to adjust the temperature of the fuel cell stack 10 to a target level, the amount of water to be evaporated in the cathode 12 may be adjusted by controlling the amount of air supplied to the cathode 12 and inner pressure of the cathode 12.

An operating temperature of the fuel cell stack 10 is a variable to be ultimately controlled in the fuel cell system 100. When the amount of vapor to be evaporated and evaporative latent heat in the cathode 12 are not controlled, cooling may not be appropriately performed and the inner temperature of the fuel cell stack 10 may be thus increased. To solve this problem, the fuel cell system 100 may control the amount of air to be supplied to the cathode 12 and the inner pressure of the cathode to control the amount of vapor to be evaporated and evaporative latent heat in the fuel cell stack 10 and maintain target temperature constant, and control the amount of heat to be emitted from the radiator 60 and the inner pressure of the radiator 60 according to the amount of vapor to be evaporated to continuously retain a certain amount of water in the water reservoir 70.

The evaporative cooling type fuel cell system 100 of FIG. 1 described above is just one of various types of a fuel cell system applicable according to one embodiment, and embodiments are not limited thereto. Thus, a fuel cell system having a different shape and structure is also applicable to embodiments. For example, although it is described with reference to FIG. 1 above that the fuel cell stack 10 is cooled by adjusting the amount of water to be supplied to the cathode 12, this is just one embodiment and an additional cooling channel may be provided in the fuel cell stack 10 to cool the fuel cell stack 10 which is overheated. A fuel cell system according to another embodiment may include a humidifier which humidifies compressed air supplied via a compressor, supplies the humidified compressed air to a cathode of a fuel cell stack, and discharges, via a vent pipe, air and hydrogen gas discharged from the cathode.

FIG. 2 is a diagram illustrating a change in the hydrogen concentration of a fuel cell stack according to an embodiment.

A fuel cell is a device which generates electric power through an electrochemical reaction between hydrogen and oxygen. To generate electric power normally, an appropriate concentration of hydrogen and oxygen should be supplied to an anode and a cathode.

In the case of the oxygen, during a normal operation period, air is continuously supplied to the fuel cell stack via an air blower, used air is discharged via an air vent of the fuel cell stack, and thus a constant concentration of oxygen may be continuously supplied to the fuel cell stack.

However, referring to FIG. 2, in the case of the hydrogen, in order to increase a rate of utilization of the hydrogen in the fuel cell stack, the fuel cell stack is operated in a state in which a hydrogen outlet is closed, and impurities are piled up in a hydrogen channel of the fuel cell as times goes by. Here, the impurities piled up in the hydrogen channel may include impurities supplied from a hydrogen reservoir, nitrogen gas transferred from the cathode via an MEA, vapor evaporating as temperature of a cell increases, etc.

Although oxygen gas may be transferred from the cathode toward the anode via the MEA, the oxygen gas may react with the hydrogen gas and be thus directly consumed by an anode catalyst. Similarly, the hydrogen gas may be transferred from the anode toward the cathode via the MEA but a most part of the hydrogen gas may react with the oxygen gas and be directly consumed by a cathode catalyst.

As the concentration of the impurities increases, the amount of hydrogen transferred to the anode catalyst decreases and thus the overall performance of the fuel cell may be lowered. To prevent this problem, most fuel cell vehicles which are on the market are controlled to discharge a discharged gas to the outside from an anode channel at predetermined intervals of time or when a certain amount of hydrogen is consumed, so that the hydrogen concentration in the anode channel may be maintained at a certain level or more.

However, it is not practically easy to measure the hydrogen concentration in the anode channel in real time. In detail, the amount of piled up impurities supplied to the fuel cell stack from the hydrogen reservoir together with hydrogen gas may be calculated by analyzing a gas stored in the hydrogen reservoir. However, it is not easy to measure or calculate effects according to movement of a gas within the fuel cell stack, i.e. crossover, caused due to a difference between pressures of the gas at opposite ends of the MEA.

In general, the hydrogen concentration in the fuel cell stack before the fuel cell stack is driven may be very high. Thus, the concentration of hydrogen gas crossing over from the anode channel to a cathode channel may be high. In this case, when a fuel cell vehicle is started 'on' and thus the fuel cell stack is driven, a small amount of air, i.e., low-flow rate air, may be supplied to the cathode channel.

Hydrogen gas accumulated in the cathode channel may be exhausted via an air exhaust line as air is supplied. In this case, the concentration of the hydrogen gas contained in an exhaust air may be very high. When the fuel cell stack is initially driven, a hydrogen purge valve may be opened to maintain the hydrogen concentration in the cathode channel at a certain level. In this case, hydrogen gas which did not react may be exhausted through the hydrogen purge valve, together with the impurities piled up in the anode channel.

Thus, the concentration of hydrogen gas contained in an exhaust gas when a vehicle is initially driven may be higher than those at other points of time. Accordingly, it is important to control the concentration of the hydrogen gas contained in the exhaust gas when the vehicle is initially driven.

FIG. 3 is a block diagram of a fuel cell system 300 according to another embodiment.

Referring to FIG. 3, the fuel cell system 300 may largely include a fuel cell stack 310, a hydrogen purge valve 320, a hydrogen supplier 330, a compressor 340, a humidifier 350, an air jet valve 360, an air jet device 361, a vent pipe 370, and a controller 380 but these elements are merely provided as examples. In another embodiment, the fuel cell system 300 may include only some of these elements or may further include other elements.

The fuel cell stack 310 may include an anode channel 311, an MEA 312, and a cathode channel 313 but these elements are merely provided as examples for convenience of explanation. The fuel cell stack 310 may further include other elements such as a cooling channel.

The hydrogen supplier 330 may supply hydrogen gas to the anode channel 311 of the fuel cell stack 310 via a hydrogen supply line 301. In this case, the amount of the supplied hydrogen gas may be dynamically controlled by the controller 380 based on electric power output from and a target operating temperature of the fuel cell stack 310 and the like.

The hydrogen purge valve 320 may be used to discharge impurities piled up in the anode channel 311 and constantly maintain the hydrogen concentration in the anode channel 311 at a certain level. For example, the controller 380 may determine a time of purging the anode channel 311, and control the hydrogen purge valve 320 to be opened at the determined purging time to transfer the hydrogen gas and impurities piled up in the anode channel 311 to the humidifier 350 via a hydrogen exhaust line 302.

The fuel cell stack 310 generates power through a reaction of oxygen supplied via an air supply line 303 and hydrogen supplied via the hydrogen supply line 301. Air used in this case may be transferred to the humidifier 350 via an air exhaust line 304.

In detail, damp compressed air is supplied to the cathode channel 313 of the fuel cell stack 310 via the air supply line 303, and hydrogen gas is supplied to the anode channel 311 via the hydrogen supply line 301. The amount of the air supplied to the cathode channel 313 may be adjusted by controlling the pressure of compressed air output from the compressor 340 by the controller 380.

The humidifier 350 may humidify the compressed air supplied via the compressor 340, and supply gases discharged from the anode channel 311 and the cathode channel 313 to the outside via the vent pipe 370 while supplying the humidified compressed air to the cathode channel 313.

When a vehicle is initially started, the hydrogen concentration of a gas discharged from the vent pipe 370 may exceed a predetermined reference level. If high-concentration hydrogen gas is discharged to the outside via the vent pipe 370, a risk of explosion and fire may be high.

FIG. 4 is a diagram illustrating a method of estimating a hydrogen crossover rate in a fuel cell system according to an embodiment.

Referring to FIG. 4, a fuel cell system 400 may include a hydrogen supplier 410, an anode 420, and a purge valve 430.

A method of estimating a hydrogen crossover rate by taking into account the amount of residual hydrogen in an anode channel of a fuel cell stack, the amount of supplied hydrogen, the amount of reacted hydrogen, and the amount of discharged hydrogen according to the present embodiment will be described in detail below.

As illustrated in FIG. 4, hydrogen gas stored in the hydrogen supplier 410 is supplied to the anode 420, i.e., a hydrogen electrode, via a hydrogen supply line 411. Here, the amount of hydrogen supplied to the anode 420 will be referred to as a hydrogen supply rate $$\dot{m}_{in}^{H2}.$$

The hydrogen supply rate may be calculated by measuring a change in the inner pressure of a hydrogen reservoir of the hydrogen supplier 410. In this case, it is assumed that the inner temperature of the hydrogen reservoir does not change.

For example, the hydrogen supply rate corresponding to the inner pressure P, volume V, and temperature T of the hydrogen reservoir may be calculated by Equation 1 below.

$$\dot{m}_{in}^{H2} = \frac{dP}{dt}\frac{V}{RT} \quad \text{(Equation 1)}$$

Here, R is a constant.

The amount of hydrogen gas supplied to the anode 420 of the fuel cell stack may be decreased according to a water generation reaction. Here, the amount of the hydrogen gas used in the water generation reaction will be referred to as a hydrogen reaction rate $$\dot{m}_{react}^{H2}.$$

In this case, the hydrogen reaction rate may be calculated based on an output current of a fuel cell.

For example, a hydrogen reaction rate corresponding to an output current of the fuel cell may be calculated by Equation 2 below.

$$\dot{m}_{react}^{H2} = \frac{I_{fc}}{4F} \quad \text{(Equation 2)}$$

Here, F is a constant.

The purge valve 430 may be installed at an outlet of the anode 420, i.e., an outlet of the hydrogen electrode. The purge valve 430 may be open for a certain time if necessary. When the purge valve 430 is open, impurities, e.g., nitrogen gas, water, etc., in the hydrogen electrode may be discharged to the air via an exhaust line 431.

Thus, it may be assumed that there is only the hydrogen gas in the hydrogen electrode for the certain time right after purging is performed and there is only the pressure of hydrogen as the inner pressure of the hydrogen electrode, i.e., the inner pressure of a channel of the anode 420. In this case, a hydrogen residual rate $$\dot{m}_{AN}^{H2}$$

in the hydrogen electrode may be calculated.

For example, a hydrogen residual rate corresponding to the inner pressure $P_{AN}$, volume $V_{AN}$, and temperature $T_{AN}$ of the channel of the anode 420 may be calculated by Equation 3 below.

$$\dot{m}_{AN}^{H2} = \frac{dP_{AN}}{dt}\frac{V_{AN}}{RT_{AN}} \quad \text{(Equation 3)}$$

Here, R is a constant.

In this case, the hydrogen residual rate is calculated after the purge valve 430 is open for a certain time and thus the amount of the hydrogen gas discharged from the hydrogen electrode, i.e., a hydrogen discharge rate $$\dot{m}_{purge}^{H2},$$

may be almost zero.

Thus, a hydrogen crossover rate $$\dot{m}_{cross}^{H2}$$

may be calculated by Equation 4 below.

$$\dot{m}_{cross}^{H2} = \dot{m}_{AN}^{H2} + \dot{m}_{in}^{H2} - \dot{m}_{react}^{H2} - \dot{m}_{purge}^{H2} \quad \text{(Equation 4)}$$

That is, the hydrogen crossover rate may be estimated by subtracting the sum of the hydrogen reaction rate and the hydrogen discharge rate from the sum of the amount of the hydrogen gas remaining in the channel of the anode 420 and the amount of the hydrogen gas supplied from the hydrogen reservoir to the channel of the anode 420.

FIG. 5 is a block diagram of an apparatus 500 for estimating hydrogen crossover loss of a fuel cell system according to an embodiment.

Referring to FIG. 5, the apparatus 500 may include a pressure sensor 510, a current sensor 520, a voltage sensor 530, a temperature sensor 540, a valve drive switch 550, a hydrogen reservoir 560, an anode 570, a purge valve 580, and a controller 590. Here, the controller 590 may include at least one microprocessor, and may include an internal memory to record thereon a program for executing a hydrogen crossover loss estimating algorithm according to an embodiment.

In the present embodiment, the apparatus 500 may be operated according to an algorithm which estimates a hydrogen crossover rate by taking into account a hydrogen residual rate, a hydrogen supply rate, a hydrogen reaction rate, and a hydrogen discharge rate of a channel of an anode as described above with reference to FIG. 4.

The pressure sensor 510 may measure a change in the inner pressure of the hydrogen reservoir 560 and a change in the inner pressure of a channel of the anode 570, and provide a result of the measurement to the controller 590. The controller 590 may calculate the hydrogen supply rate based on the change in the inner pressure $$\frac{dP}{dt}$$

of the hydrogen reservoir 560. Furthermore, the controller 590 may calculate the hydrogen residual rate based on the change in the inner pressure $$\frac{dP_{AN}}{dt}$$

of the channel of the anode 570. In this case, it may be assumed that the inner temperature of hydrogen reservoir 560 does not change.

According to another embodiment, the apparatus 500 may measure the inner temperature of the hydrogen reservoir 560 using the temperature sensor 540.

In this case, the controller 590 may calculate the hydrogen supply rate $$\dot{m}_{in}^{H2}$$

corresponding to the inner pressure P, volume V, and temperature T of the hydrogen reservoir 560 by Equation 5 below.

$$\dot{m}_{in}^{H2} = \frac{dP}{dt}\frac{V}{RT} \quad \text{(Equation 5)}$$

Here, R may be a constant, and V may be a constant determined by the size of a hydrogen reservoir of the fuel cell system.

The current sensor 520 may measure intensity of a current output from the anode 570, i.e., a current output from a fuel cell, and provide a result of the measurement to the controller 590. In this case, the controller 590 may calculate a hydrogen reaction rate $$\dot{m}_{react}^{H2}$$

corresponding to the amount of hydrogen gas used in a water generation reaction based on the intensity of the current output from the anode 570. For example, the controller 590 may calculate a hydrogen reaction rate corresponding to a current $I_{fc}$ output from the fuel cell by Equation 6 below.

$$\dot{m}_{react}^{H2} = \frac{I_{fc}}{4F} \quad \text{(Equation 6)}$$

Here, F is a constant.

The voltage sensor 530 may measure a voltage of each of cells of the fuel cell. The fuel cell system may include a plurality of cells. A minimum voltage to be generated using each of the plurality of cells may be determined according to an operating voltage of the fuel cell. If pinholes occur in some cells of the fuel cell, output voltages of the cells with the pinholes may be less than the minimum voltage. According to this fact, the controller 590 may determine whether all the cells of the fuel cell are normal based on a measured voltage of each of the plurality of cells.

Thus, the controller 590 may determine that there is no pinhole when an estimated hydrogen crossover rate is greater than or equal to a predetermined reference value and when a cell voltage of the fuel cell is normal. That is, when the cell voltage of the fuel cell is normal, the controller 590 may determine whether pipe leakage occurs by comparing the estimated hydrogen crossover rate with a predetermined leakage occurrence reference value.

When the cell voltage of the fuel cell is abnormal, the controller 590 may determine whether a pinhole occurs by comparing the estimated hydrogen crossover rate with a predetermined pinhole occurrence reference value.

The purge valve 580 may be installed at an outlet of the anode 570, i.e., an outlet of a hydrogen electrode. The controller 590 may control the valve drive switch 550 to open or close the purge valve 580. When the controller 590 opens the purge valve 580 for a certain time as occasion demands, impurities, e.g., nitrogen gas, water, etc., in the hydrogen electrode may be discharged to the air through the purge valve 580.

Thus, there may be only hydrogen gas in the hydrogen electrode for a certain time right after purging is performed. Accordingly, it may be assumed that there is only the pressure of the hydrogen gas as the inner pressure of the hydrogen electrode, i.e., the inner pressure of the channel of the anode 570. Based on the above assumption, the controller 590 may calculate a hydrogen residual rate $$\dot{m}_{AN}^{H2}$$

in the hydrogen electrode.

For example, the hydrogen residual rate $$\dot{m}_{AN}^{H2}$$

corresponding to the inner pressure $P_{AN}$, volume $V_{AN}$, and temperature $T_{AN}$ of the channel of the anode 570 may be calculated by Equation 7 below.

$$\dot{m}_{AN}^{H2} = \frac{dP_{AN}}{dt} \frac{V_{AN}}{RT_{AN}} \quad \text{(Equation 7)}$$

Here, R may be a constant, and the volume $V_{AN}$ may be a constant determined according to the type of a channel of an anode of the fuel cell system. The temperature $T_{AN}$ may be a value measured by the temperature sensor 540.

In this case, since the hydrogen residual rate $$\dot{m}_{AN}^{H2}$$

is calculated after purging is performed, the amount of the hydrogen gas discharged from the hydrogen electrode, i.e., a hydrogen discharge rate $$\dot{m}_{purge}^{H2},$$

may be almost zero.

Accordingly, the controller 590 may estimate a hydrogen cross rate $$\dot{m}_{cross}^{H2}$$

by Equation 8 below.

$$\dot{m}_{cross}^{H2} = \dot{m}_{AN}^{H2} + \dot{m}_{in}^{H2} - \dot{m}_{react}^{H2} - \dot{m}_{purge}^{H2} \quad \text{(Equation 8)}$$

That is, the controller 590 may estimate the hydrogen crossover rate $$\dot{m}_{cross}^{H2}$$

by subtracting the sum of a hydrogen reaction rate and a hydrogen discharge rate from the sum of the amount of the hydrogen gas remaining in the channel of the anode 570 and the amount of the hydrogen gas supplied from the hydrogen reservoir 560 to the channel of the anode 570.

As described above, the controller 590 may compare an estimated hydrogen crossover rate with a predetermined reference value(s) to determine whether a pinhole occurs and whether pipe leakage occurs.

For example, when it is determined that the cell voltage of the fuel cell is abnormal, the controller 590 may compare the estimated hydrogen crossover rate with a predetermined pinhole occurrence reference value $$m_{hole}^{H2}.$$

If the estimated hydrogen crossover rate exceeds the pinhole occurrence reference value $$m_{hole}^{H2},$$

the controller 590 may determine that there is a pinhole.

On the other hand, when the cell voltage of the fuel cell is determined to be normal, the controller 590 may compare the estimated hydrogen crossover rate with a predetermined leakage occurrence reference value $m_{leak}^{H2}$.

If the estimated hydrogen crossover rate exceeds the predetermined leakage occurrence reference value $m_{leak}^{H2}$, the controller 590 may determine that leakage occurs in a hydrogen supply system, e.g., a hydrogen gas supply pipe.

FIG. 6 is a flowchart of a method of estimating a cause of hydrogen crossover loss of a fuel cell system according to an embodiment.

The method of estimating hydrogen crossover loss of a fuel cell system according to the present embodiment may be performed by the apparatus 500 for estimating hydrogen crossover loss described above with reference to FIG. 5.

Referring to FIG. 6, an apparatus for estimating hydrogen crossover loss (hereinafter referred to as the 'apparatus' for convenience of explanation) may determine whether purging of a channel of an anode is completed during operation of a fuel cell (operations S610 and S620).

When it is determined that it is not long after the purging of the channel of the anode, the apparatus may estimate a hydrogen crossover rate (operation S630). Here, a method of estimating the amount of hydrogen crossing over in a hydrogen electrode is as described above with reference to FIGS. 4 and 5.

The apparatus may determine whether a cell voltage of the fuel cell is normal (operation S640).

When it is determined that the cell voltage of the fuel cell is normal, the apparatus may determine whether the estimated hydrogen crossover rate exceeds a predetermined leakage occurrence reference value (operation S650). When a result of the comparison reveals that the estimated hydrogen crossover rate exceeds the predetermined leakage occurrence reference value, the apparatus may determine that leakage occurs in the hydrogen supply system (operation S660).

When it is determined in operation S640 that the cell voltage of the fuel cell is abnormal, the apparatus may compare whether the estimated hydrogen crossover rate exceeds a predetermined pinhole occurrence reference value (operation S670). When a result of the comparison reveals that the estimated hydrogen crossover rate exceeds the predetermined pinhole occurrence reference value, the apparatus may determine that there is a pinhole in a cell of the fuel cell (operation S680).

According to another embodiment, the apparatus may determine whether the cell voltage of the fuel cell is normal only when the hydrogen crossover rate estimated in operation S630 exceeds a predetermined minimum reference value. When the estimated hydrogen crossover rate does not exceed the predetermined minimum reference value, the apparatus may return to operation S610 described above.

Advantageous effects of methods and apparatuses according to embodiments will be described below.

Embodiments provide a method and apparatus for estimating hydrogen crossover loss of a fuel cell system.

Embodiments also provide a method and apparatus for estimating hydrogen crossover loss of a fuel cell system, which are capable of sensing the occurrence of a pinhole or a pipe leakage based on an estimated hydrogen crossover loss rate and a cell voltage of a fuel cell.

Advantageous effects of embodiments are, however, not limited thereto and additional effects would be apparent to those of ordinary skill in the art from the above-described description.

The above-described method of controlling the concentration of hydrogen discharged from a fuel cell system can be embodied as computer-readable codes in a computer-readable recording medium. The computer-readable recording medium may be any recording medium capable of storing data that is read by a computer system, e.g., a read-only memory (ROM), a random access memory (RAM), a magnetic tape, a magnetic disk, a flash memory, an optical data storage device, and so on. The computer-readable recording medium can be distributed among computer systems that are interconnected through a network, and embodiments may be stored as computer-readable codes in a distributed manner, and downloaded to and executed by a desired device.

While exemplary embodiments have been described above, it would be apparent to those of ordinary skill in the art that the embodiments may be embodied in many different forms without departing from the idea and scope of the inventive concept defined in the following claims.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A hydrogen crossover loss estimating apparatus included in a fuel cell system which produces power through a reaction of hydrogen serving as fuel and air serving as an oxidizer, the apparatus comprising:
   a hydrogen reservoir;
   an anode configured to be supplied with hydrogen gas from the hydrogen reservoir and to produce the power;
   a purge valve configured to control an exhaust gas output from the anode;
   a voltage sensor configured to measure a cell voltage of a fuel cell; and
   a controller configured to:
   determine whether a pinhole of the fuel cell or a leakage of a hydrogen gas supply pipe occurs based on the measured cell voltage of the fuel cell and an estimated hydrogen crossover rate, wherein the hydrogen crossover rate is estimated by the controller when purging is performed,
   determine the pinhole occurs in the fuel cell when the measured cell voltage of the fuel cell is abnormal and the estimated hydrogen crossover rate exceeds a first reference value, and
   determine the leakage occurs in the hydrogen gas supply pipe when the measured cell voltage of the fuel cell is normal and the estimated hydrogen crossover rate exceeds a second reference value,
   wherein the measure cell voltage is determined to be normal when an output voltage of the fuel cell is higher than or equal to a minimum required voltage determined according to an operating voltage of the fuel cell, and is determined to be abnormal when the output voltage of the fuel cell is lower than the minimum required voltage.

2. The apparatus of claim 1, wherein, when the estimated hydrogen crossover rate exceeds a predetermined minimum reference value, the controller determines whether the cell voltage of the fuel cell is normal.

3. The apparatus of claim 1, wherein the controller calculates a hydrogen supply rate which is an amount of hydrogen supplied from the hydrogen reservoir to the anode, a hydrogen residual rate of the anode, and a hydrogen reaction rate of the anode, and estimates the hydrogen crossover rate by subtracting the hydrogen reaction rate from a sum of the hydrogen supply rate and the hydrogen residual rate.

4. The apparatus of claim 3, further comprising a pressure sensor configured to measure inner pressure of the hydrogen reservoir,
   wherein the controller calculates the hydrogen supply rate based on a change in the inner pressure of the hydrogen reservoir.

5. The apparatus of claim 4, further comprising a temperature sensor configured to measure inner temperature of the hydrogen reservoir,
    wherein the controller calculates the hydrogen supply rate based on the inner temperature of the hydrogen reservoir.

6. The apparatus of claim 5, wherein the pressure sensor further measures inner pressure of the anode, and
    the temperature sensor further measures inner temperature of the anode,
    wherein the controller calculates the hydrogen residual rate based on a change in the inner pressure and the temperature of the anode.

7. The apparatus of claim 3, further comprising a current sensor configured to measure a current output from the fuel cell system, wherein the controller calculates the hydrogen reaction rate based on the current output from the fuel cell system.

* * * * *